United States Patent [19]

Söderberg

[11] 4,090,463
[45] May 23, 1978

[54] ANCHORING MEANS
[76] Inventor: Gunnar Söderberg, Kvarnlyckan 7, Billdal, Sweden, 43081
[21] Appl. No.: 766,095
[22] Filed: Feb. 7, 1977
[30] Foreign Application Priority Data
Feb. 11, 1976 Sweden .............................. 76014828
[51] Int. Cl.² ............................................. B63B 21/24
[52] U.S. Cl. ................................... 114/294; 43/44.91; 24/136 R; 114/293
[58] Field of Search ................. 43/44.91, 44.96, 44.97; 24/136 R, 136 B, 114.5; 114/242, 244, 253, 293, 294

[56] References Cited
U.S. PATENT DOCUMENTS 1,771,406  7/1930  Fountain .............................. 114/294
2,916,785 12/1959  Daugert ............................. 24/136 R
2,992,508  7/1961  Schmidt ............................. 43/44.91
3,020,670  2/1962  Lockhart ........................... 43/44.91

Primary Examiner—Trygve M. Blix
Assistant Examiner—D. W. Keen
Attorney, Agent, or Firm—H. Ross Workman; J. Winslow Young

[57] ABSTRACT

A boat anchoring means includes, beside the conventional anchor, a number of sinker bodies attached to the hawser rope, adjacent to the anchor. In order that these sinkers shall not cause damage to the hull or equipment, and provide a good grip during hauling-in, each sinker is formed as a symmetrical body of rotation, is covered by a soft shell, and is maintained at the rope by a tubular wedge member adapted to be driven into a tapering, axial passage through the sinker.

3 Claims, 4 Drawing Figures

ANCHORING MEANS

BACKGROUND OF THE INVENTION

The present invention refers to anchoring means including an additional weight to be attached to the hawser rope between the anchor and the point where the rope connects to a boat.

A number of boat anchors of more or less complicated shape have been proposed with the intention of obtaining a safe grip at the bottom, while preventing the anchor from being wedged, or in other way locked to obstacles at the bottom. Beside a satisfactory anchor it is, however, adviseable to have some additional weight between the anchor and the point where the hawser rope is attached to the boat. Such additional weight is preferably fitted to the rope close by the anchor, and will normally rest upon the bottom, forming a first buffer, taking up ordinary loads on the hawser rope.

It has earlier been proposed to use a length of chain between the anchor and the rope. Such a chain will form an additional weight, which is well suited for buffering purposes. It suffers however from certain drawbacks during the handling of the anchor on board the ship. A main objection is that the chain, in order to fulfil its object must be rather heavy, which means that it may easily damage the sides or the railing of the boat, when the anchor is being lowered, or pulled in.

This is especially the case with modern boats having hulls made of plastics, and provided with high railings. During hauling-in the chain is unpleasent to handle. A chain will soon become affected by rust, and may then soil sails and cause other damage.

Other arrangements have been proposed, where one or more weights have been attached to the rope, at some distance from the anchor.

A main object of the invention is to avoid the abovementioned drawbacks, and to provide an additional weight which may be applied to an hawser rope to provide a desired distribution of the weight, and which will offer a safe and agreeable grip during the later steps of the hauling-in movement.

SUMMARY OF THE INVENTION

To that end the invention proposes an additional weight composed of a number of individual sinkers having a smoothly rounded shape and a soft shell adapted to be applied to the rope in spaced relationship at the portion of the rope adjacent to the anchor.

DESCRIPTION OF SOME PREFERRED EMBODIMENTS

Figure 1:
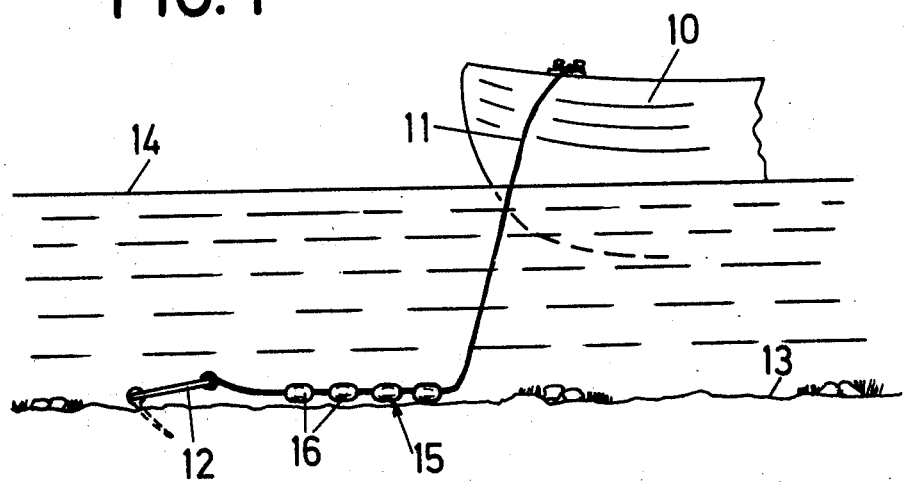
FIG. 1 schematically shows a boat anchored by means including an additional weight according to the invention.

In FIG. 1 a portion of a boat is denoted by 10. This boat is tied by means of a hawser rope 11 and an anchor 12 gripping in the bottom 13 of a body of water 14. At the portion of rope 11 adjacent to anchor 12 an additional weight 15 is attached. This weight, according to the invention, includes a number of individual sinkers applied around rope 11.

Figure 2:
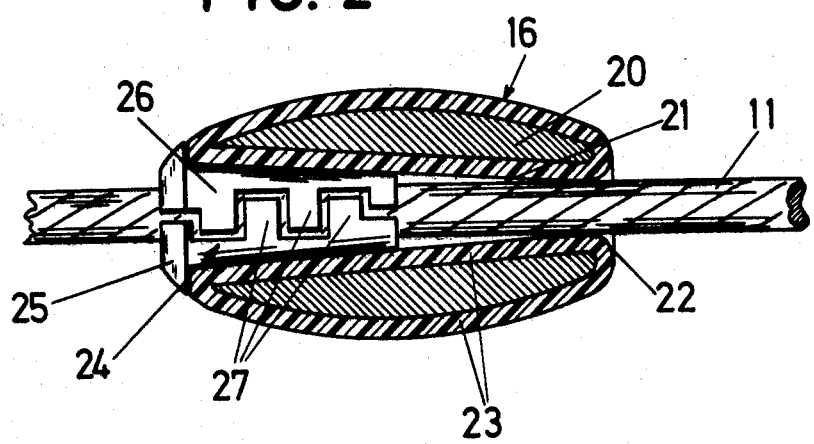
FIG. 2 is a longitudinal section through a sinker forming part of the additional weight shown in FIG. 1, and FIGS. 3 and 4 show a modified embodiment of the invention.

FIG. 2 shows a section through one of sinkers 16 having a preferred shape. The sinker is composed of an egg-shaped core of lead, or cast iron, provided with an axial passage 21 dimensioned to permit the introduction of hawser rope 11.

The passage tapers inwards from one of its ends over a considerable extent of its length, the wider end being preferably turned towards the anchor. The mouth at the narrower end of the passage is smoothly rounded, so as to prevent chafing of the rope. The sinker is externally, as well as along the passage covered by a shell 23 of soft material, such as rubber or synthetic resins. The sinker will, in use, symmetrically enclose the rope, and differs in that respect from known additional weights.

For retaining sinker 16 at the rope 11 a tubular wedge body 24 is used. This is preferably manufactured of synthetic resin and has an envelop surface mating with the tapering shape of passage 21.

The wedge body 24 composed of two halves, which together form an end flange 25 and a main portion 26, formed as a slotted tube, in mounted position reaching a considerable distance into the passage. The tube may be slotted in various ways in order to ensure a safe wedge action. In the embodiment shown, the juxtaposed edges of a slot are provided with interengaging tongues 27.

Figure 3:
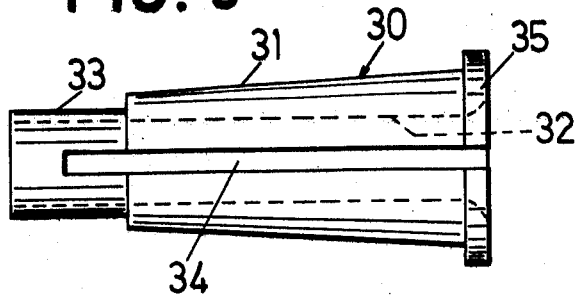
Figure 4:
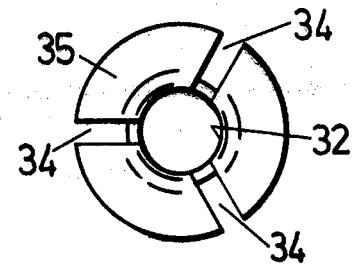

FIGS. 3 and 4 show a modified embodiment of wedge member. The wedge member, 30, is made of elastic material in one piece and has a tapering envelop surface 31 and a cylindrical internal surface 32. At the narrower end of the tubular member a short, cylindrical portion 33 is formed, having a reduced diameter compared to that of the adjacent end of the conical part.

Three axially directed slots 34 extend from a flange 35, all the way through the conical part and a considerable distance into the cylindrical portion. In this manner it is possible to obtain a satisfactory resiliency also at the narrow end of the conical part, so an efficient clamping of the rope all along the conical part is obtained.

The sinkers may be formed as symmetrical bodies of rotation, such as spheres, or short cylinders with slightly rounded ends, and it is evident that any desired number of sinkers may be attached to the rope, taking the size of the boat and the weight of the anchor into consideration.

The sinkers furthermore can be locked to the rope in a spaced relationship, ensuring safe grips during the hauling-in. The soft shell will prevent damage, and as there is always some short length of rope between adjacent sinkers, the stowing on board implies no difficulties. One important advantage is that the expensive component, the sinker body, can be formed so the passage suits the heaviest rope being used for a certain type of boat. By using wedges of different thickness it is possible to use these sinkers also with thinner ropes.

What I claim is:

1. A boat anchoring means including an anchor, a hawser rope attached thereto as well as at least one sinker attachable to said hawser rope, at a distance from the anchor:
   1. each sinker including a body, formed as a symmetrical body of rotation, having an axial passage for reception of the rope, said passage, at least along part of its length, having an inwardly tapering form; and
   2. a tubular wedge member including a portion having a tapered body with a tapered envelope surface mating with the tapering surface of the passage and an internal surface adapted to enclose said hawser rope, the wedge member being manufactured of resilient material in one piece and including an end flange at the wider end of the tapered body with a short cylindrical portion formed as an extension at the other end of the tapered body, the cylindrical portion having a reduced diameter as compared to that of the narrower end of the tapering portion, at least two slots extending axially along the wedge member, the slots extending from the end flange through the tapered body portion and a considerable distance into the cylindrical portion.

2. The anchoring means according to claim 1, in which each sinker body is manufactured of heavy metal, and is inwardly and outwardly covered by a soft shell, preferably of synthetic resin.

3. A boat anchoring means including an anchor and a hawser rope attached thereto, the anchoring means further including:

a number of basically egg-shaped sinkers, each sinker having an axial passage for reception of a rope, said passage having an inwardly tapered form along at least part of its length, each sinker body being manufactured of heavy metal and being inwardly and outwardly covered by a soft shell of synthetic resin; and a number of tubular wedge means, each tubular wedge means comprising a wedge body formed from at least two halves which together form a slotted tube, the juxtaposed edges of the slots having interengaging tongues to ensure a safe wedge action, the wedge body having a flange and a tapered envelope surface mating with the tapering surface of the passage in the sinker; the tubular wedge having an internal surface adapted to enclose said hawser rope for positioning said bodies in spaced relationship along the end of said rope adjacent the anchor.

* * * * *